United States Patent

[11] 3,584,557

[72] Inventors Jacob S. Haller; Hans J. Kist, both of Northbrook, Ill.
[21] Appl. No. 744,923
[22] Filed July 15, 1968
[45] Patented June 15, 1971
[73] Assignee Identification Development Corporation

[54] EXPOSURE ASSEMBLY
9 Claims, 21 Drawing Figs.

[52] U.S. Cl. ........ 95/18
[51] Int. Cl. ........ G03b 37/00
[50] Field of Search ........ 95/18

[56] References Cited
UNITED STATES PATENTS

| | | | |
|---|---|---|---|
| 2,869,446 | 1/1959 | Franceschint | 95/18 X |
| 3,323,432 | 6/1967 | Rabinit | 95/18 |
| 3,223,007 | 12/1965 | Craven et al. | 95/18 X |
| 3,443,499 | 5/1969 | Gianino | 95/18 |

*Primary Examiner*—Samuel S. Matthews
*Assistant Examiner*—Michael Harris
*Attorney*—Dressler, Goldsmith, Clement and Gordon

ABSTRACT: An exposure assembly for alternately effecting sequential or simultaneous split image exposures of a plurality of regions within a fixed area, exposure of each portion of a split image being effected through a separate lens. An optical mask, disposed between the lenses and the area to be exposed, is alternatively positionable either to allow sequential split image exposure of each region or to allow simultaneous split image exposure of all regions. Upon initiation of operation in the sequential mode, the optical mask automatically rotates after each region is exposed to allow for the exposure of the next region. Alternatively, in the simultaneous mode, the optical mask allows for simultaneous exposure of all regions, in which event the optical mask is not rotated after each exposure.

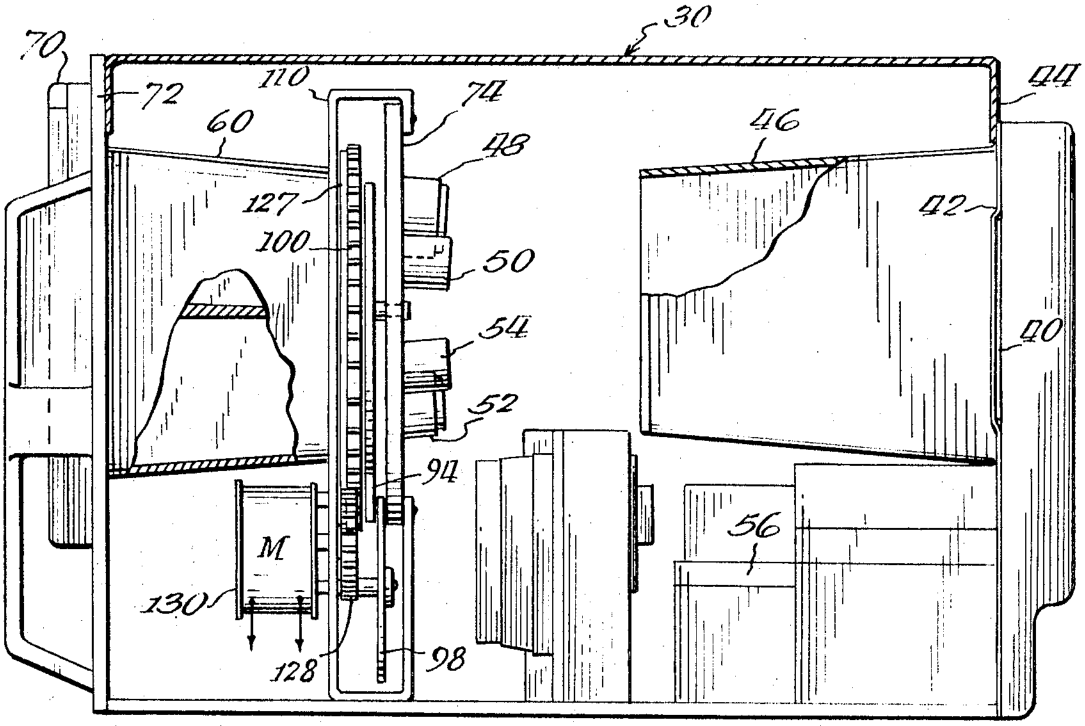
Fig. 2
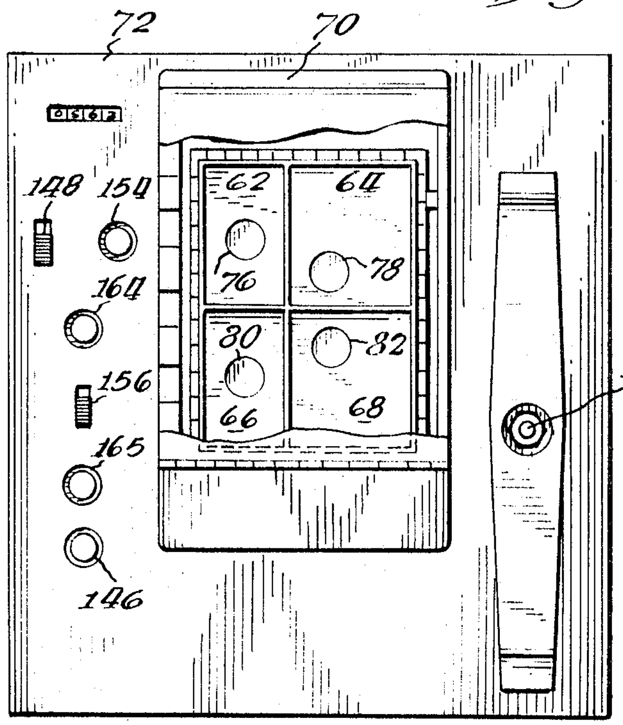
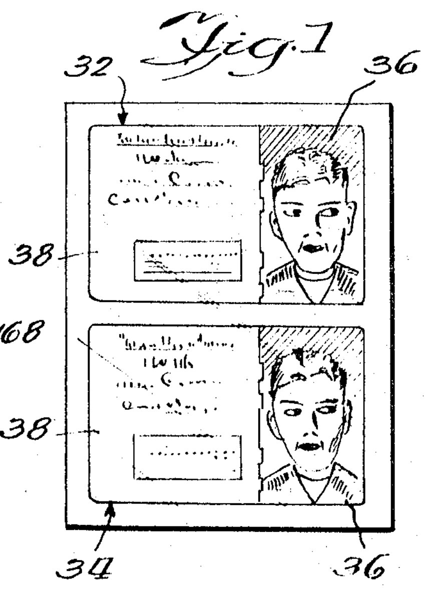
Fig. 3
INVENTORS
Jacob S. Haller
Hans J. Kist
BY Dressler, Goldsmith, Clement & Gordon
ATTORNEYS INVENTORS
Jacob S. Haller
Hans J. Kist
BY Dressler, Goldsmith, Clement & Gordon
ATTORNEYS INVENTORS
Jacob S. Haller
Hans J. Kisl
BY Dressler, Goldsmith, Clement & Gordon
ATTORNEYS INVENTORS
Jacob S. Haller
Hans J. Kist
BY Dressler, Goldsmith, Clement & Gordon
ATTORNEYS INVENTORS
Jacob S. Haller
Hans J. Kist
BY Dressler, Goldsmith, Clement, Gordon
ATTORNEYS INVENTORS
Jacob S. Haller
Hans J. Kist
BY Dressler, Goldsmith, Clement & Gordon
ATTORNEYS INVENTORS
Jacob S. Haller
Hans J. Kisl
BY Dressler, Goldsmith, Clement, & Gordon
ATTORNEYS INVENTORS
Jacob S. Haller
Hans J. Kist
BY Dressler, Goldsmith, Clement & Gordon ATTORNEYS INVENTORS
Jacob S. Haller
Hans J. Kist
BY Dressler, Goldsmith, Clement & Gordon
ATTORNEYS INVENTORS
Jacob S. Haller
Hans J. Kist
BY
ATTORNEYS

EXPOSURE ASSEMBLY

BACKGROUND OF THE INVENTION

There are many occasions when it is desirable for photographs to consist of a split image. In the production of photographic identification cards, for example, one portion of the split image could be a picture of the person being identified, and the other portion of the split image could be other identifying material, such as a card containing appropriate printed information.

In the production of such split image pictures, particularly for photographic identification cards, a plurality of identical pictures are often desired rather than a single picture or a plurality of different pictures. Satisfying these changing demands can be particularly difficult when the pictures being taken are to be made available immediately or shortly after they are taken. Under such circumstances, taking a series of photographs, if more than one is requested, not only introduces undesirable delays but such a series of pictures are not, of course, identical.

It is highly desirable, therefore, for a camera which is adaptable for use with products which allow for immediate availability of the photograph, such as Poloroid film, to have the capability of taking a plurality of split image single pictures, either sequentially or simultaneously. Such a camera should be reliable, simple to operate (since, for example, photographic identification cards are often produced under pressure and in large numbers) and should be capable of relatively error proof operation since, under the conditions which prevail when such pictures are taken, mistakes can occur quite readily if the apparatus is complicated to operate.

SUMMARY OF THE INVENTION

In accordance with the present invention, there is provided an exposure assembly usable, for example, with a camera in which split image exposures of a plurality of regions within a fixed area may be effected sequentially or simultaneously.

For convenience and clarity, the present invention is described herein with respect to its use as part of a camera and, in particular, as part of a camera used in the production of photographic identification cards. However, it should be understood that the present invention is applicable to any camera and to other devices in which a plurality of split image exposures are to be made simultaneously or sequentially.

A camera suitable for use with the present invention includes a plurality of optically separate channels, e.g., four in number, extending from the exposure assembly which is mounted in the front of the camera to a film to be exposed which is attached to the back of the camera. The optical channels are arranged in pairs, each pair being utilized to effect a split image exposure of one region of the film. The portion of the film disposed behind each optical channel being exposed through a separate lens aligned therewith.

The exposure assembly of the present invention is capable of effecting two modes of operation: (b 1) split image exposure of the film sequentially through each pair of optical channels, or (2) split image exposure of the film simultaneously through all of the optical channels thereby producing two identical split image photographs.

In a typical arrangement, the exposure assembly includes a lens support disposed in front of four optical channels. The lens support has four lens openings, each opening being aligned with one of the optical channels. A lens is mounted in each lens opening.

The exposure assembly also includes an optical mask in the form of a rotatable turret which is disposed between the lens support and the film, usually in front of the optical channels. In a four-channel two photograph embodiment, the optical mask is provided with a first pair of apertures which can be aligned with a first pair of the lens openings, with a second pair of apertures which may be aligned with the second pair of the lens openings, and with a third pair of apertures which, in combination with one aperture from each of the first two pairs, may be aligned with all four of the lens openings. Thus, when exposure is made, the region of the film exposed is determined by which of the optical mask apertures are aligned with which lens openings. This alignment is dependent upon the position of the optical mask.

When the sequential mode of operation is selected, the optical mask turret is automatically positioned with its first pair of apertures aligned with the first pair of lens openings. After the first exposure has been effected through these openings, the optical mask turret is automatically rotated to position its second pair of apertures in alignment with the second pair of lens openings to allow for split image exposure of the second region of the film. After this exposure, the optical mask turret is automatically rotated to again position its first set of apertures in alignment with the first set of lens openings to repeat the sequential cycle. A reset mechanism may be provided to prevent double exposures by inadvertent repetition of the cycle.

Alternatively, the simultaneous mode of operation may be selected. In this mode, the optical mask turret is automatically positioned with four apertures aligned with all four lens openings. Thus, upon exposure of the film, two identical split image photographs are simultaneously produced. The optical mask turret does not rotate in this mode of operation since the entire film is exposed simultaneously. The reset mechanism is automatically activated after each exposure to prevent double exposures.

Exposure of the film is effected by a simple reciprocally rotating shutter plate having a slot therein for each lens opening. The shutter plate is rotatable between an open position where each of its slots is in alignment with a lens opening, thereby allowing exposure through the aligned optical mask apertures, and a closed position where all the lens openings are optically separated from the film.

In operation in the sequential mode, exposure is effected by depressing an actuating switch to initiate operation of a timing motor and timing disc. The disc is provided with a pin which engages an axial extension on the shutter plate causing the plate to rotate to its open position to effect the desired exposure. As the timing disc continues to rotate, its pin releases the axial extension, and the shutter plate returns to its closed position under action of a biasing spring.

A sequential mode advance switch is momentarily closed by the timing disc as it continues to rotate to close an electrical turret motor circuit, thereby initiating rotation of the optical mask turret. As the optical mask turret is rotated to align its second pair of apertures with the second pair of lens openings, it closes a sequential mode stop switch in the turret motor circuit. The sequential mode stop switch opens when the optical mask turret is properly positioned with its second pair of apertures aligned with the second pair of lens openings.

Upon repetition of the cycle, the optical mask turret is again rotated until its first pair of apertures are in alignment with the first pair of lens openings. Simultaneously therewith, a sequential mode reset switch is momentarily closed to operate a reset circuit which deactivates the shutter operating mechanism and indicates that the film is completely exposed and should be changed.

When the alternative, simultaneous mode of operation is selected, the optical mask turret is rotated until all of the third group of four apertures are aligned with all four lens openings. Upon operation of the shutter switch, the timing disc rotates to effect the exposure as described above. However, in this mode of operation, the turret motor is disconnected from the circuit. The optical mask turret therefore is not rotated, since all exposures have been effected simultaneously. The reset mechanism is operated to indicate that the film is exposed.

Numerous other advantages and features of the present invention will become readily apparent from the following detailed description of the invention and of one embodiment thereof, from the claims, and from the accompanying drawings in which each and every detail shown is fully and completely disclosed as part of this specification, in which like reference numerals refer to like parts, and in which:

FIG. 1 shows a typical photograph capable of being taken with a camera incorporating the exposure assembly of the present invention;

FIG. 2 is a diagrammatic side view, partially in section, of the overall arrangement of a camera with the exposure assembly;

FIG. 3 is a back view of the camera of FIG. 2 showing two pairs of optical channels;

Figure 4:
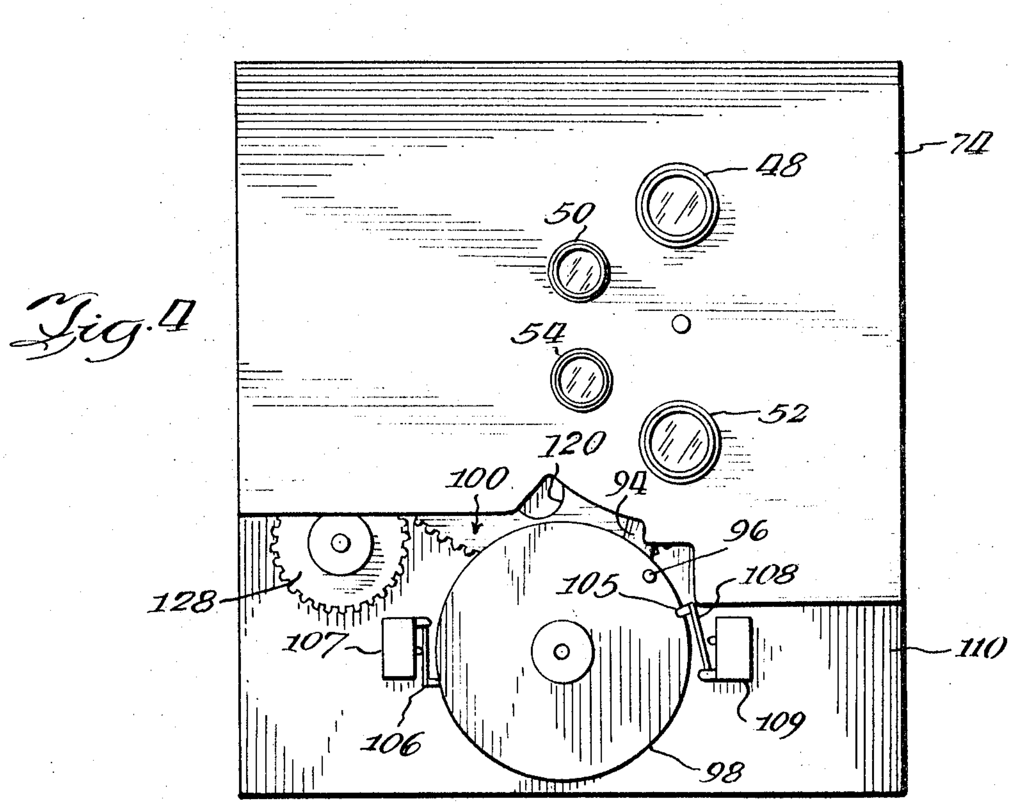
FIG. 4 is a front view of the camera showing the four lenses in position.

FIGS. 10—16 are circuit diagrams showing various states of the control circuitry for the single mode of operation; and FIGS. 17—21 are circuit diagrams showing various states of the control circuitry for the twin mode of operation.

Referring now to the drawings, there is shown one embodiment of the exposure assembly of the present invention mounted on a camera 30. In the disclosed embodiment, the camera 30 is designed to take two pictures 32, 34 in the form of split images, each consisting of one portion 36 in which an object, e.g., the face of a person, external to the camera 30 is photographed, and another portion 38 in which an object containing identifying indicia, such as a printed card 40, is placed in the camera 30 and photographed.

The camera 30 consists of a casing (not shown) which provides a light, tight closure to allow for desired exposure of the card 40 inside the camera. The card 40 is disposed in a slot 42 formed in the front face 44 of the camera 30. The front face 44 also supports any necessary optics 46 used to reduce the optical separation between the objects being photographed to conform with the separation between each pair of lenses 48, 50 and 52, 54. While the optics in the present embodiment are shown in conjunction with the external object, it should be understood that such optics could be used in conjunction with either, or both, of the external or internal objects. The front face 44 also supports a focus spot 56 which is utilized to align the camera on the external object.

The exposure assembly is supported on the camera's main casting 60 which is divided into two pairs of optical channels 62, 64 and 66, 68, respectively. The optical channels 62, 66 delineate the portions within each split image region which are exposed to the external object, while optical channels 64, 68 define the portions of each split image region which are exposed to the internal object, the identification cards 40. A film pack 70, such as a Poloroid film pack, is attached to the back 72 of the main casting 60 and completely covers the optical channels 62, 64, 66 and 68.

The four lenses 48, 50, 52, 54 are mounted on a lens support 74 provided with suitable lens openings 76, 78, 80, 82 in which each of the lenses 48, 50, 52, 54 are supported in alignment with optical channels 62, 64, 66, 68, respectively.

Figure 8:
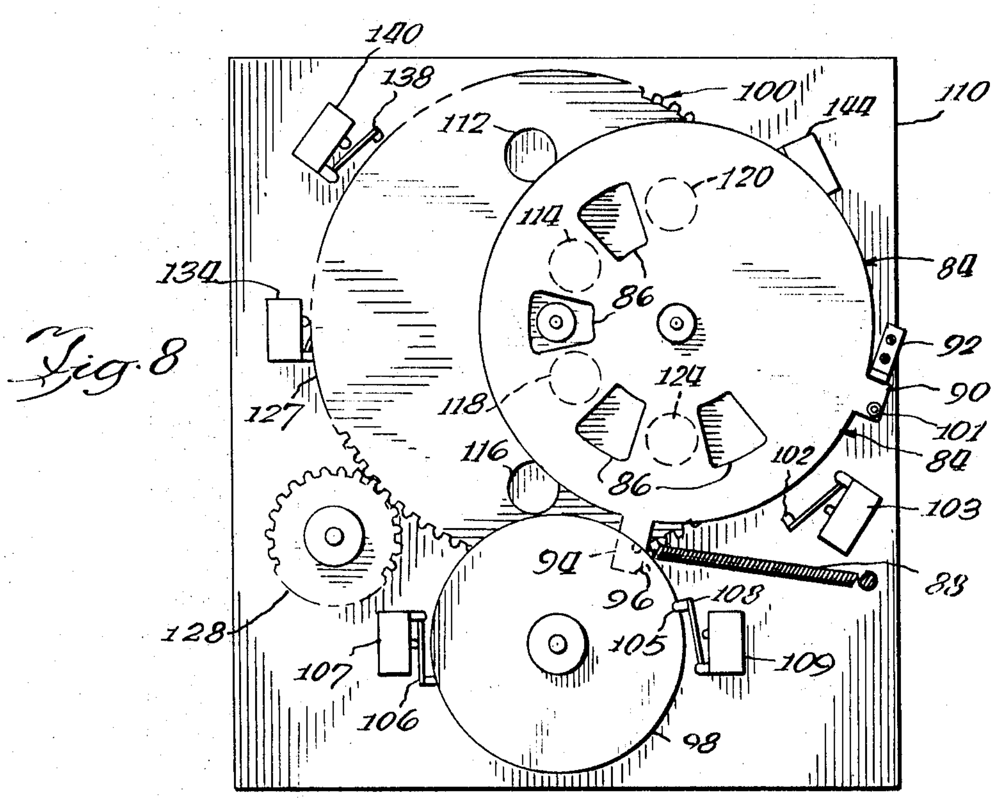
FIG. 8 is a front view of the camera showing the shutter plate in closed position.

Exposure is effected by a shutter plate 84 pivotally attached to the lens support 74. The shutter plate 84 includes a plurality of exposure slots 86, one for each of the lens openings 76, 78, 80, 82. The shutter plate 84 is biased into closed position (FIG. 8) by a bias spring 88 in which position a stop segment 90, which extends out from the periphery of the shutter plate 84, abuts against a fixed shutter stop 92. In its closed position, the shutter plate 84 completely separates the optical channels 62, 64, 66, 68 and the lens openings 76, 78, 80, 82 to prevent exposure of the film in film pack 70.

Figure 9:
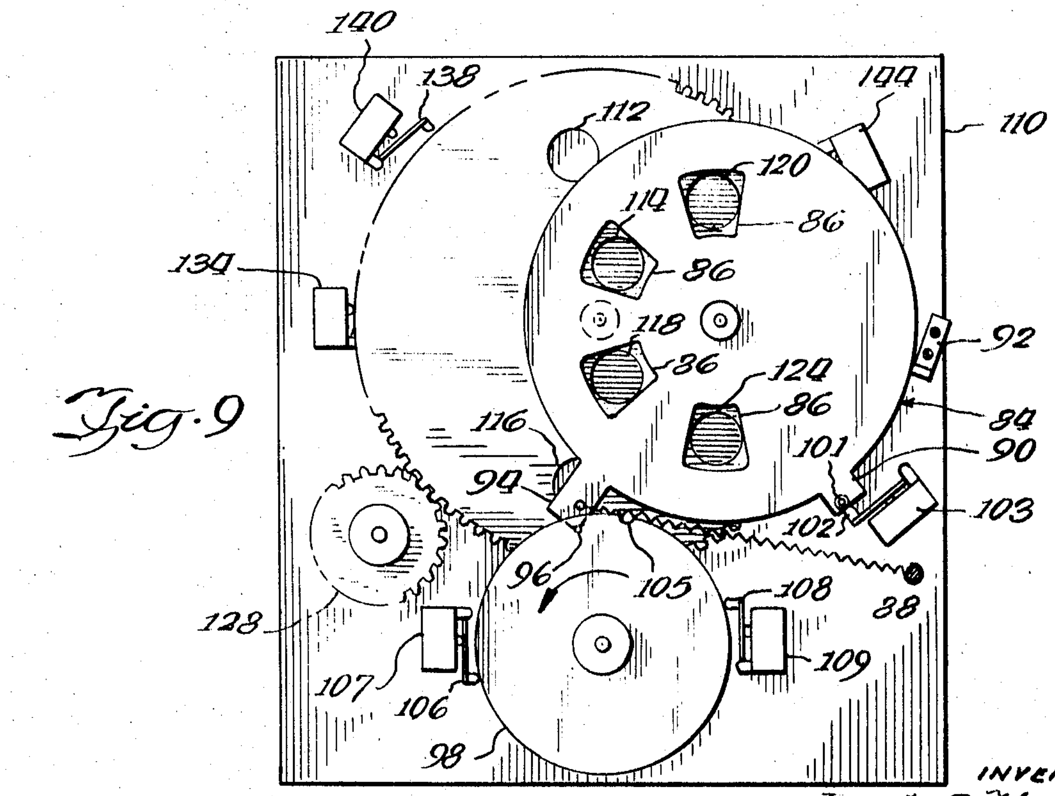
FIG. 9 is a front view similar to FIG. 8 showing the shutter plate in open position.

The shutter plate 84 is provided with an axial extension 94 adapted to be engaged by a shutter pin 96 attached adjacent the periphery of a timing disc 98. As the timing disc 98 rotates, the shutter pin 96 engages the axial extension 94, causing the shutter plate 84 to rotate to its open position (FIG. 9) in which the exposure slots 86 completely uncover optical channels 62, 64, 66, 68, to expose the film through those lens openings uncovered by an optical mask 100, depending on the operating mode of the assembly. When the optical channels are uncovered, a pin 101 affixed to the stop segment 90 engages the contact arm 102 of a flash switch 103 to close an electrical circuit triggering a pair of flash units (not shown), thereby effecting the desired exposure of the external subject and of the identification card 40.

As the timing disc 98 continues to rotate, the shutter pin 96 releases the axial extension 94 allowing the shutter plate 84 to return to its closed position under action of the bias spring 88. The timing disc 98 continues to rotate, being driven by a timing motor 104 shown schematically in the electrical circuit diagram of FIGS. 10—21.

As the timing disc 98 rotates, a detent 105 in its peripheral surface engages the contact arm 106 of a sequential mode/advance simultaneous mode reset switch 107 to momentarily close the switch 107 and initiate, in the sequential mode, rotation of the optical mask 100. The timing disc completes its cycle of operation when the detent 105 engages the contact arm 108 of timing switch 109 deenergize the timing motor 104.

The optical mask 100, in the form of a turret, is rotatably mounted on a main support 110 affixed to the main casting 60. The optical mask 100 includes a first plurality of groups of apertures, a first pair of apertures 112, 114 and a second pair of apertures 116, 118, which together are utilized in the sequential mode of operation. The optical mask 100 also includes a second plurality of apertures, including apertures 114, 118, 120, 124, which are utilized in the simultaneous mode of operation.

The periphery 127 of optical mask turret 100 is geared to allow it to be driven through gear drive wheel 128 by a turret motor 130, illustrated schematically in the circuit diagram of FIGS. 10—21.

Figure 5:
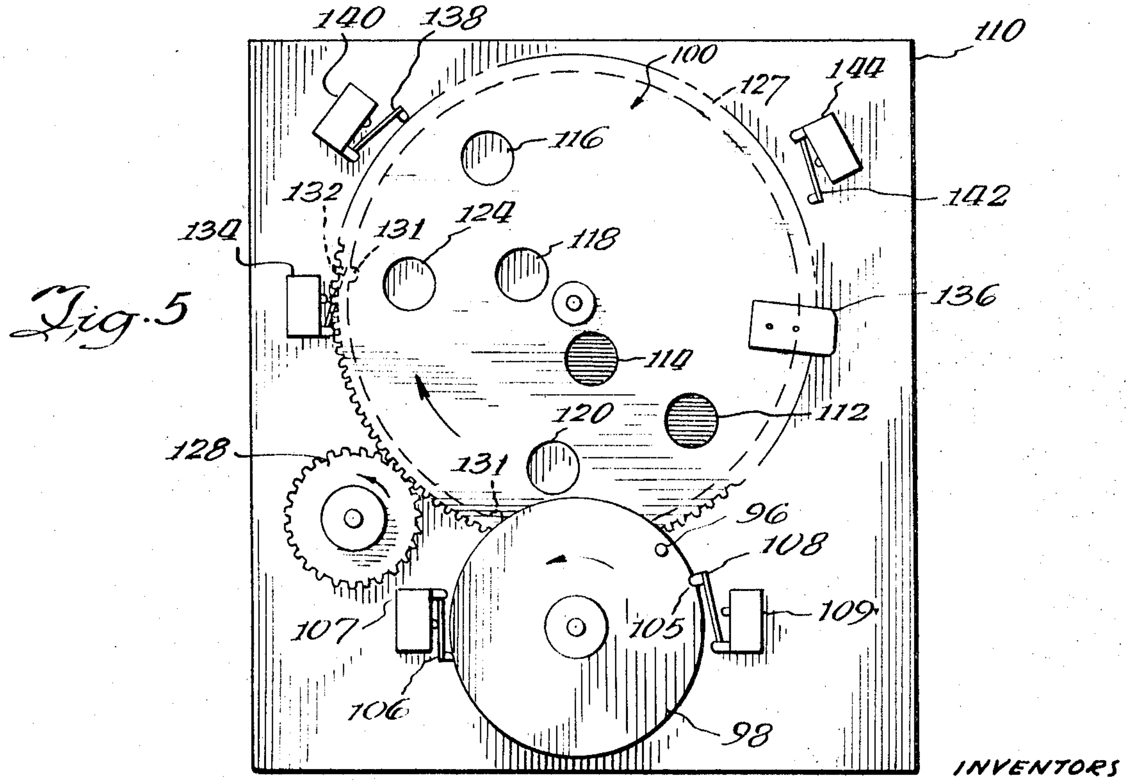
FIG. 5 is a front view of the camera showing the optical mask turret positioned for taking the first split image picture in the sequential mode of operation.
Figure 6:
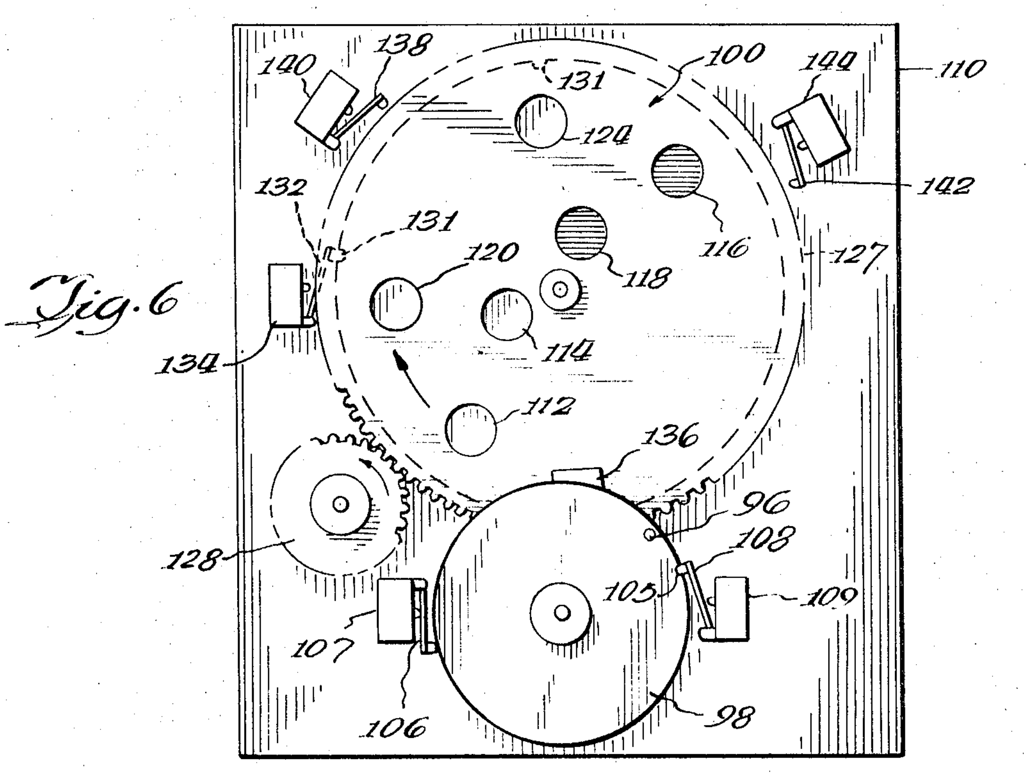
FIG. 6 is a front view similar to FIG. 5 showing the optical mask turret in position to take the second photograph in the sequential mode of operation.

As the optical mask turret 100 rotates, a pair of detents 131 in its periphery engages the contact arm 132 of normally closed sequential mode stop switch 134 to open the switch and stop rotation of the optical mask turret 100 in either of its two sequential mode operating positions (FIGS. 5 and 6) when this mode is selected. A switch actuator 136 which extends axially out from the periphery of optical mask turret 100 engages the contact arm 138 of normally closed simultaneous mode stop switch 140 as the optical mask turret 100 rotates to open the switch 140 and stop the turret in simultaneous mode operating position (FIG. 6). When this mode is selected, the switch actuator 136 also engages the contact arm 142 of normally open sequential mode reset switch 144 to momentarily close the switch to initiate operation of the reset mechanism consisting of a double holding relay 145 and reset switch 146, which consists of reset light 146*a* and reset button 146*b*.

Figure 10:
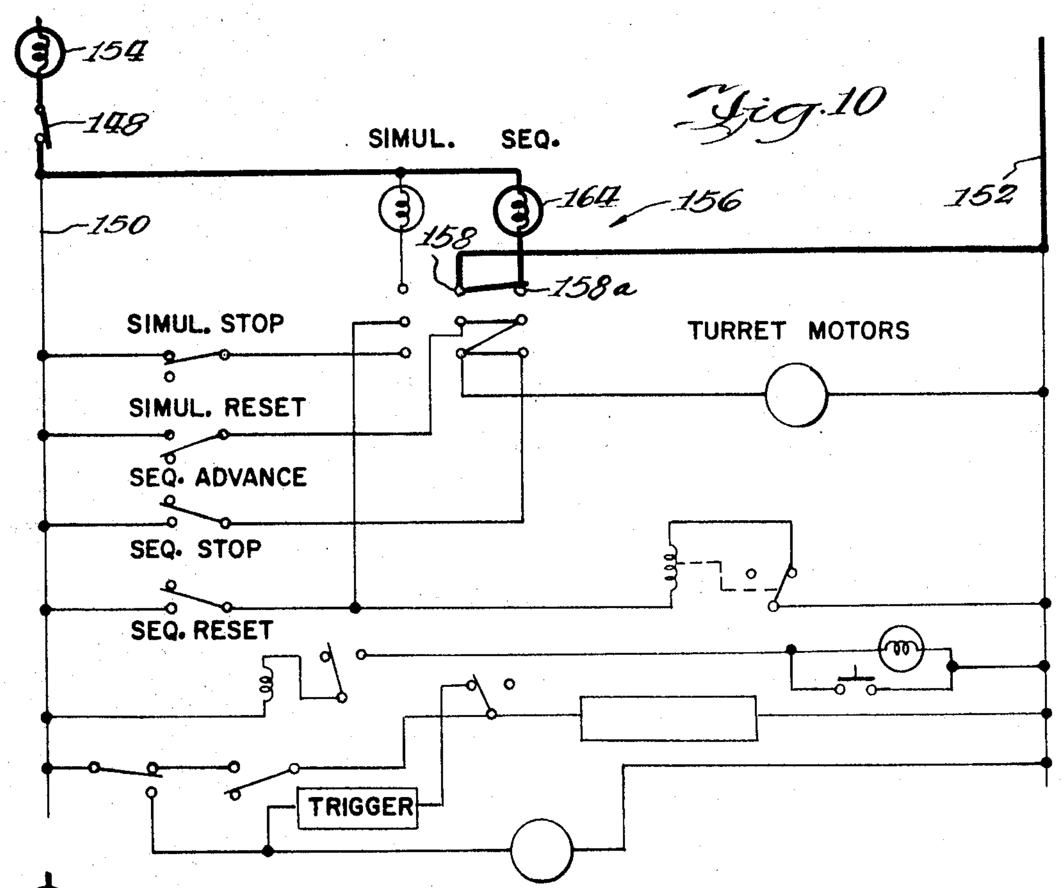
Figure 11:
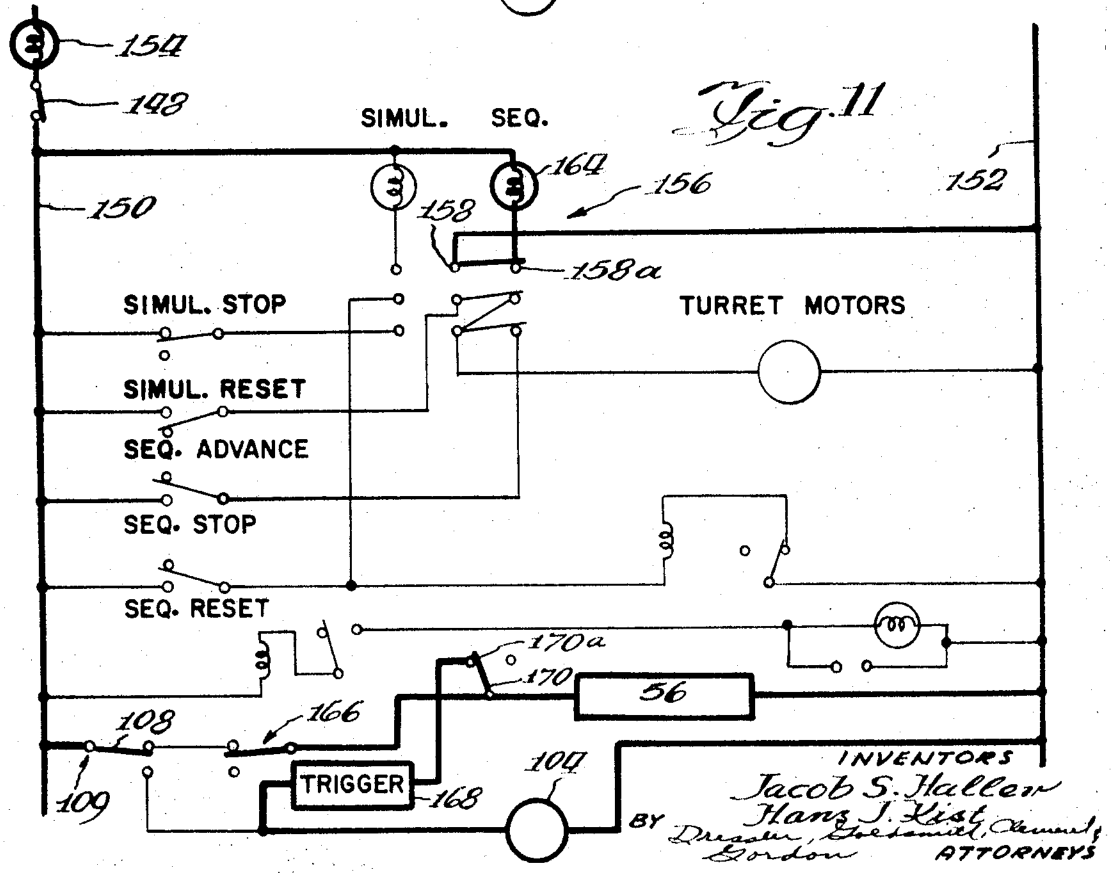
Figures 16, 17:
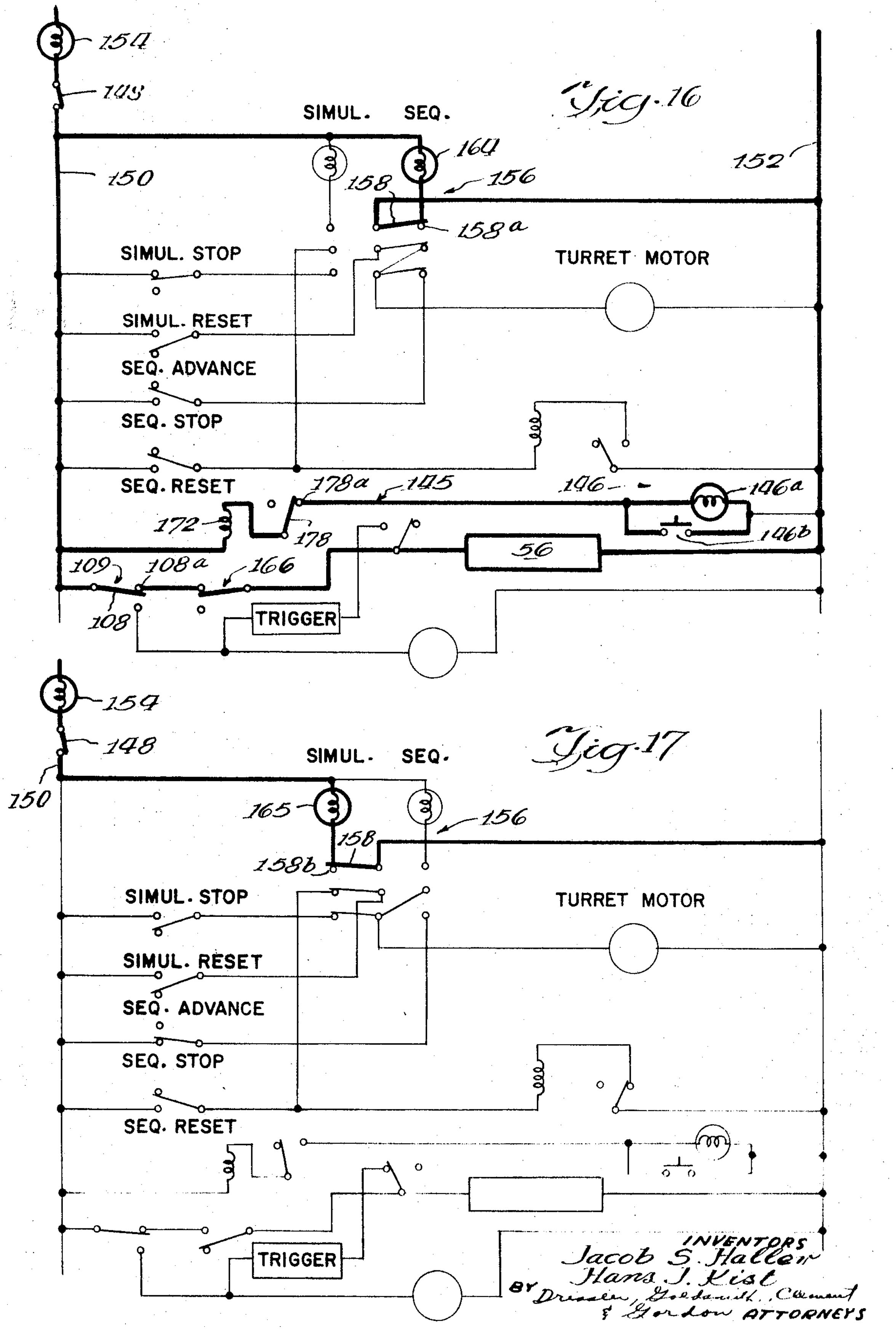

In order to operate the exposure assembly 58, a power switch 148 connected in series with supply lines 150, 152 is closed. The power switch 148 is located on the back 72 (FIG. 3) as is a power on bulb 154 which lights when the power switch 148 is closed. When the power switch 148 is closed, one of two mode indicator bulbs, the sequential mode bulb 164 or simultaneous mode bulb will light, depending upon the position of mode selector switch 156 (FIGS. 10 and 17).

The operating mode is selected by a triple pole, double throw mode select switch 156 having three movable contacts 158, 160, 162 which contact, respectively, either three sequential mode fixed contacts 158*a*, 160*a*, 162*a* or three simultaneous mode fixed contacts 158*b*, 160*b*, 162*b*.

Operation of the camera 30 and exposure assembly 58 in each mode will be explained separately. Operation in the single mode is best understood in conjunction with FIGS. 10–16. When power switch 148 is closed, which is indicated by power on bulb 154, the single mode indicator bulb 164 will also light (FIG. 10).

In preparing the camera for operation, a card 40, which is to be photographed, is inserted into slot 42 in the front face 44, thereby closing card safety switch 166. Operation of the camera is then initiated by closing trigger switch 168 located on back 72 to start the timing motor 104 by completing a circuit through the timing motor 104, trigger switch 168, the normally closed A–2 contacts 170, 170*a* operated by a coil 172 of the double holding relay 145, the card safety switch 166, and the normally closed contact 108*a* and movable contact 108 of timing switch 109 (FIG. 11) to power line 106.

Figures 12, 13:
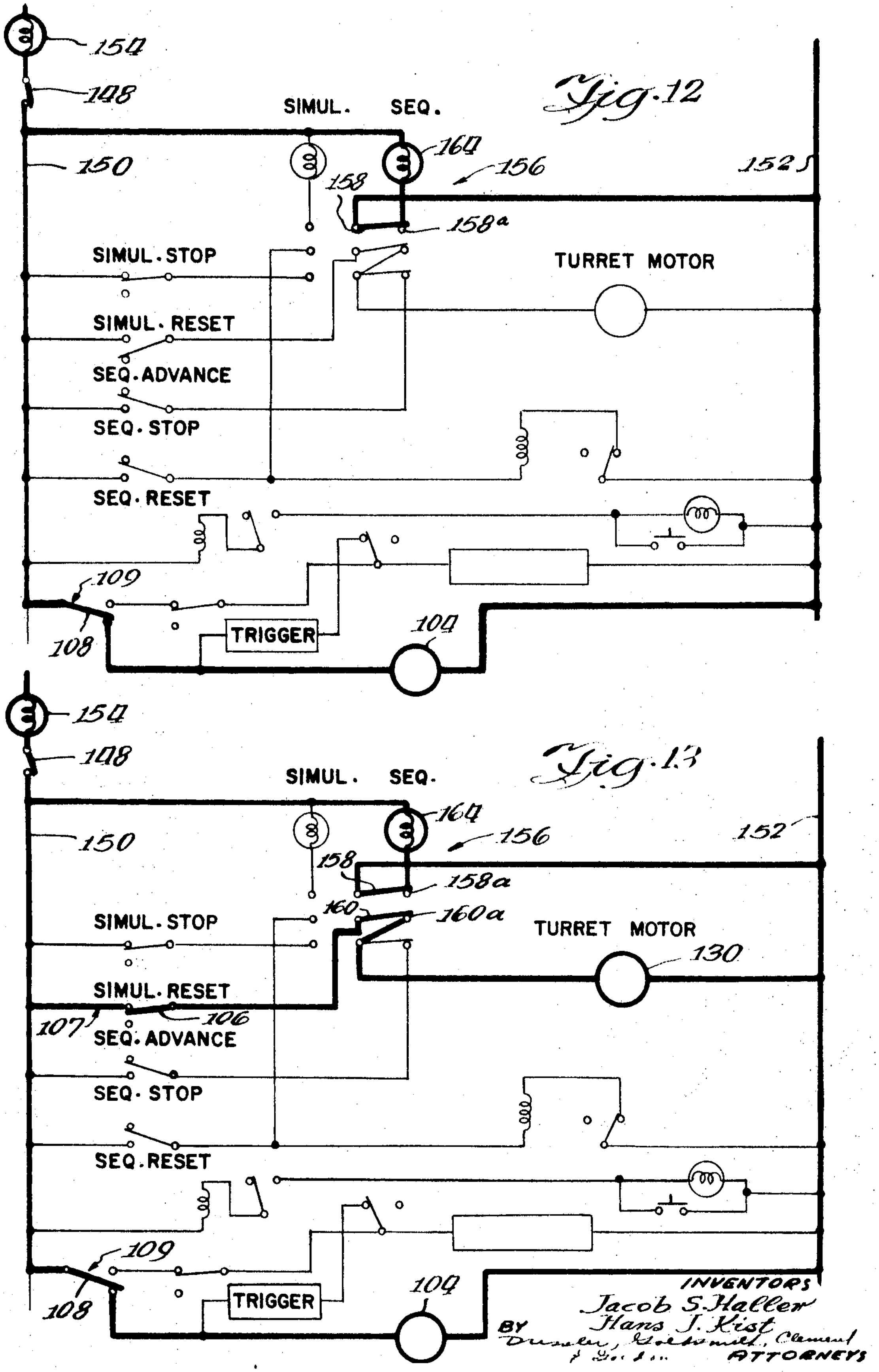

As explained above, when the timing disc 98 is rotated by the timing motor 104, the movable contact 108 of shutter switch 109 is shifted from normally closed contact 108*a* to the normally open contact 108*b* to bypass the trigger switch 168 to maintain the circuit through timing motor 104 closed, even after the trigger switch 168 is released. This movement of the movable contact arm 108 of timing switch 109 also opens the circuit through the focus spot 56 to turn the spot off during the exposure (FIG. 12). As the timing disc 98 rotates, its shutter pin 96 engages the axial extension 94 on shutter plate 84 to effect exposure, as explained above. Since the optical mask turret is in the position shown in FIG. 5, in which apertures 112, 114 are aligned with lens openings 76, 78 and optical channels 62, 64, only the first split image picture 32 is exposed.

Figures 14, 15:
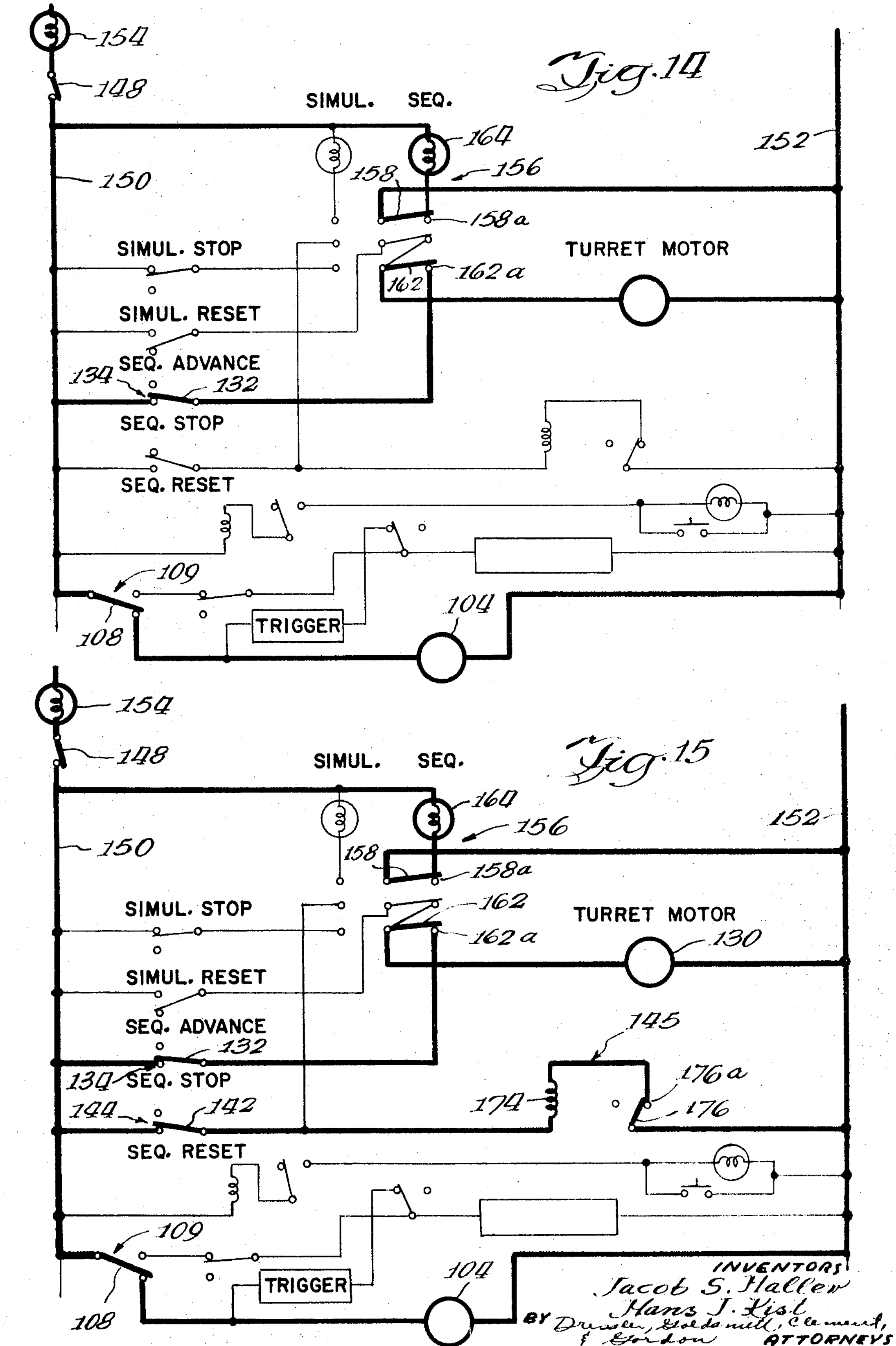

After this exposure has occurred, detent 105 in the periphery of rotating timing disc 98 engages the contact arm 106 of simultaneous twin mode reset/sequential mode advance switch 108 to momentarily close the switch to initiate operation of the turret motor 130 (FIG. 13). Although the simultaneous mode reset/sequential mode advance switch 108 is closed only momentarily, initial rotation of the optical mask turret 100 closes the sequential stop switch 134 to keep the turret motor energized (FIG. 14). The turret motor 130 continues to rotate the optical mask turret 100 until it is in position with the second pair of apertures 116, 118 aligned with the second pair of lens openings 80, 82, at which point the movable contact arm 132 of switch 134 is opened by engaging the detent 131 in the periphery of optical mask turret 100 to stop the motor 130 and the turret 100 in the position shown in FIG. 6.

The second sequential mode exposure is then effected by repeating the cycle just described. However, during rotation of the optical mask turret 100 after the second exposure, the actuator 136 engages the contact arm 142 of the sequential reset switch 144 to close switch 144 and complete a circuit through B relay coil 174 of the double holding relay 145 through normally closed B contacts 176, 176*a* (FIG. 15).

This opens B contacts 176, 176*a*, thereby opening the circuit through B coil 174 and shifts A movable contacts 170, 178 from contact with normally closed contacts 170*a*, 178*a* to normally open contacts 170*b*, 178*b*. This completes a circuit through A coil 172, A contacts 178, 178*a* and reset switch 146 to light the reset bulb 146*a* to indicate that the trigger switch 168 is inactivated (FIG. 16). Due to the resistance of the bulb 146*a*, the amount of current passing through the A relay coil 172 is insufficient to operate the relay.

In order to reset the camera, the reset button 146*b* is depressed, thereby the double holding relay 145 to return the movable contacts 170, 176, 178 to the position shown in FIG. 10 to enable the trigger to again initiate an exposure cycle.

Figure 7:
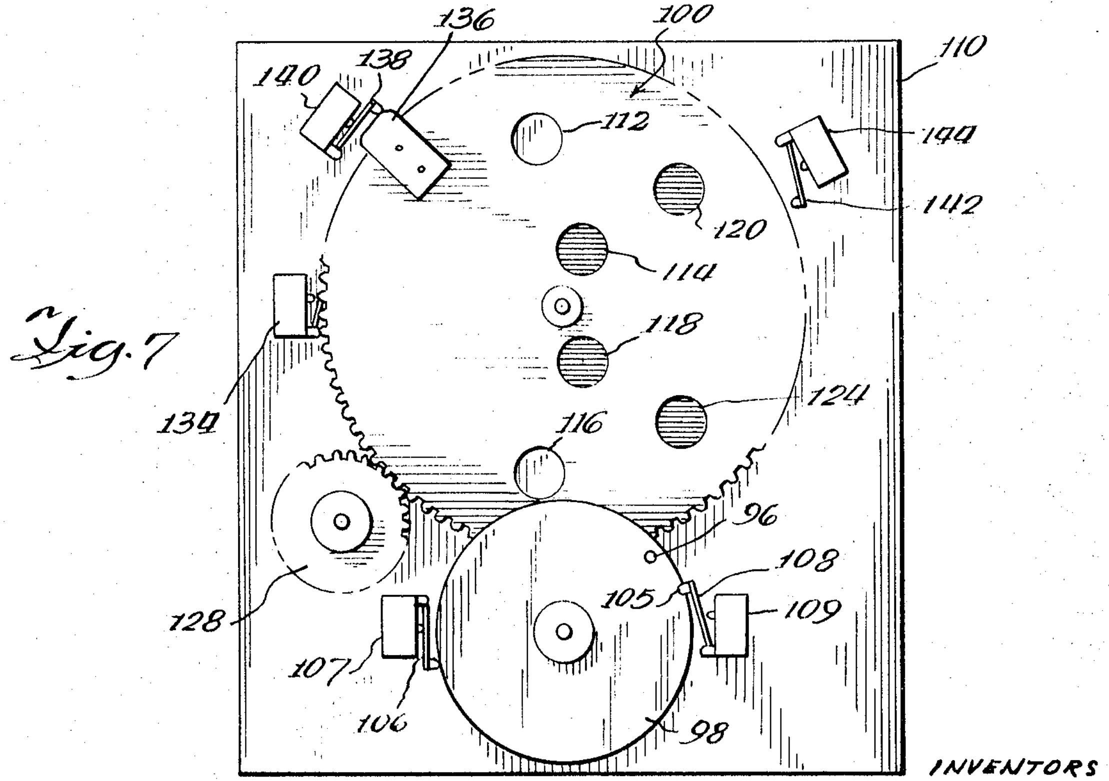
FIG. 7 is a front view similar to FIG. 5 showing the optical mask turret in position for simultaneous twin mode of operation.

When it is desired to operate the camera in its simultaneous mode, the movable contacts 158, 160, 162 of mode selector switch 156 are contacted with the simultaneous mode fixed contacts 158*b*, 160*b*, 162*b*, as shown in FIG. 17. If the optical mask turret 100 is not already in simultaneous mode operating position (FIG. 7), the simultaneous mode stop switch 140 will be closed to activate the turret motor 130 to rotate the turret 100 to the desired position, at which point the contact arm 138 of switch 140 is opened by actuator 136. In this position, apertures 114, 118, 120, 124 are aligned with all the lens openings 76, 78, 80, 82 and with all the optical channels 62, 64, 66, 68.

Figures 18, 19:
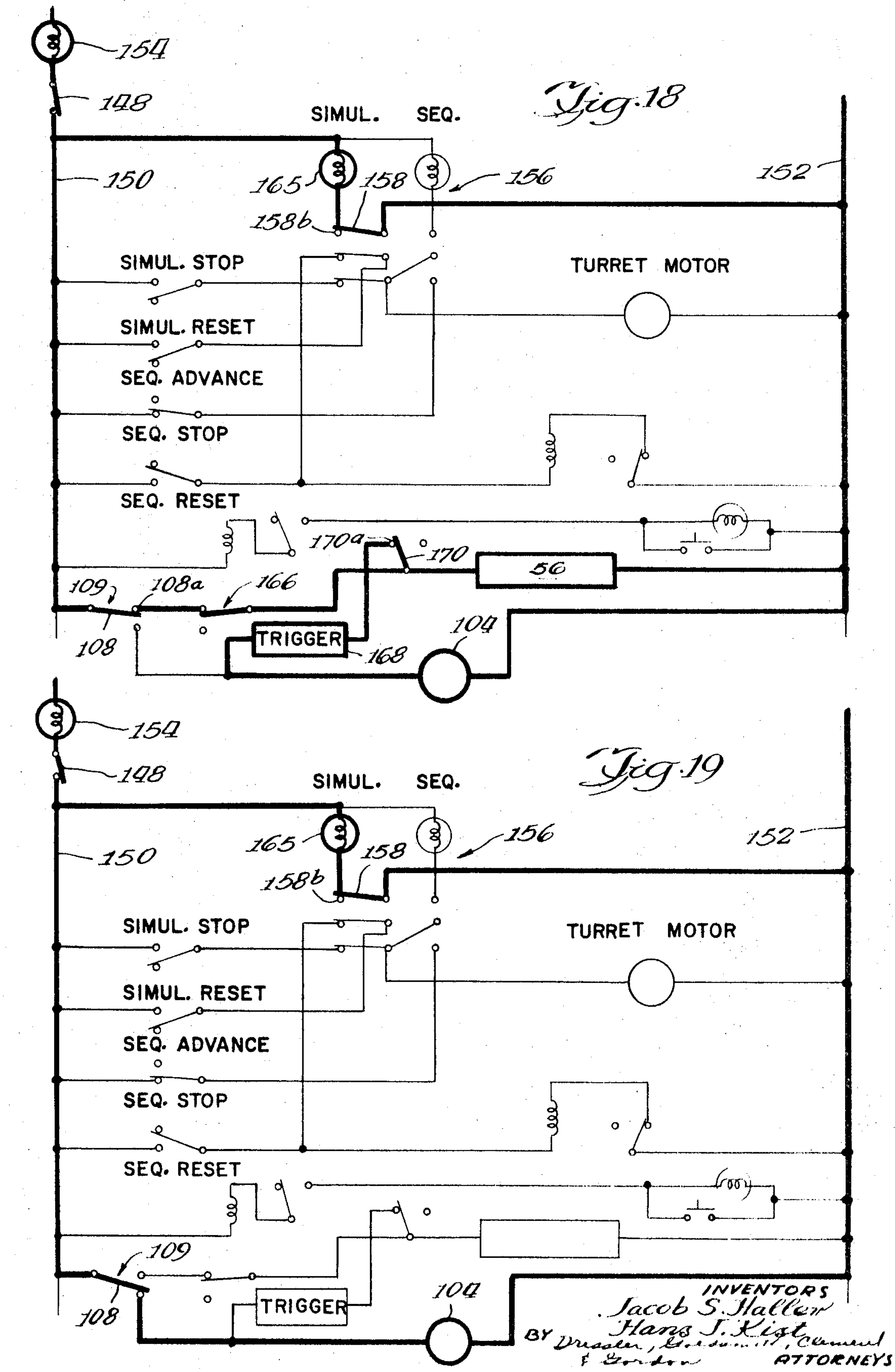
Figures 20, 21:
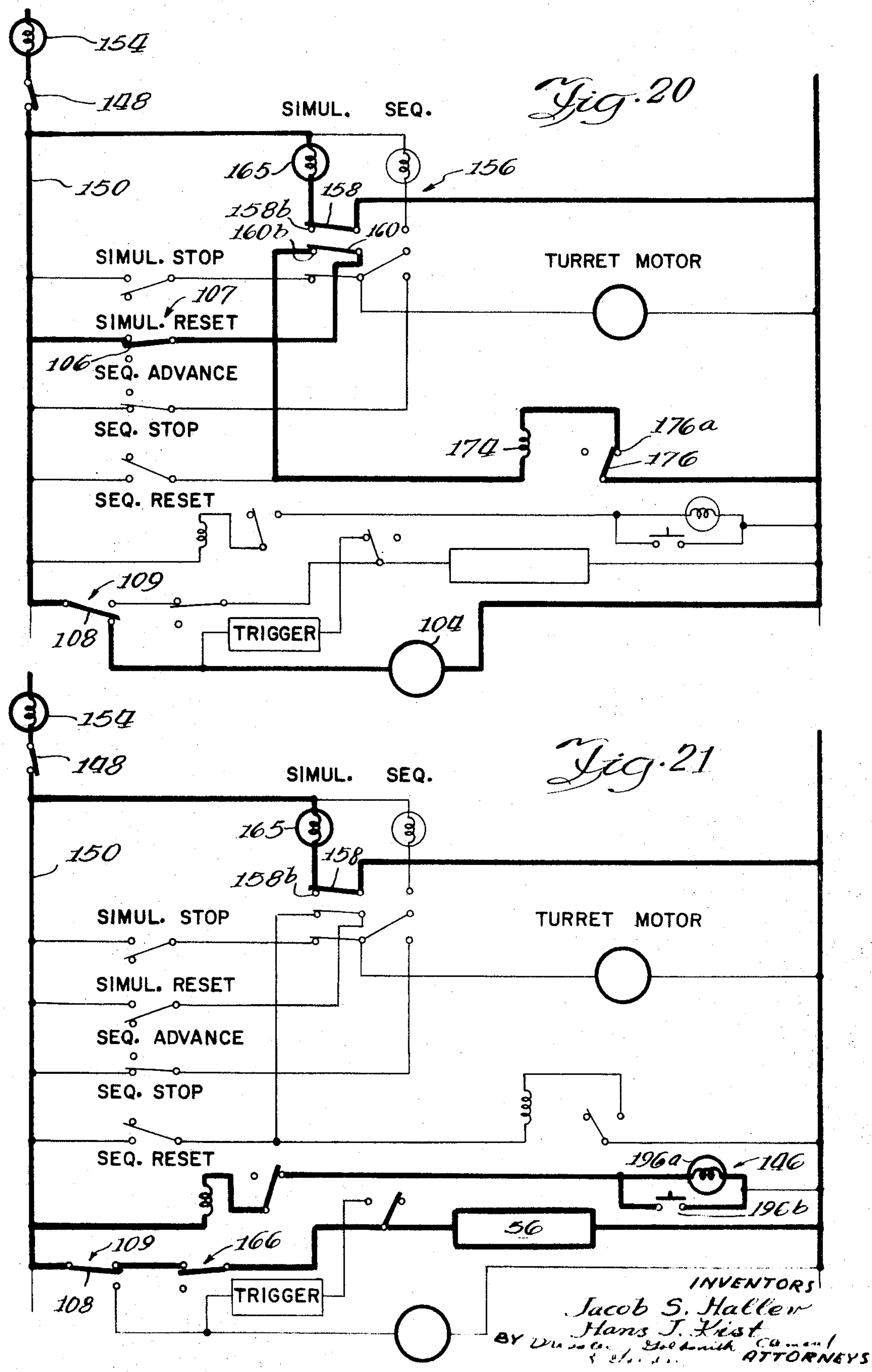

Initiation of the exposure cycle is again effected by closing the trigger switch (FIG. 18). This initiates operation of the timing motor 104 to rotate the timing disc 98 and effect exposure, as explained above. The rotating timing disc operates the movable contact 108 of the timing switch 109 to bypass the trigger and maintain the timing motor 104 energized (FIG. 19). After exposure, continued rotation of the timing disc 98 closes the simultaneous mode reset/sequential mode advance switch 108 to complete the circuit through relay coil B, as described above, to operate the double holding relay 145 and switch the movable contacts 170, 176, 178 into reset position to deactivate the trigger circuit (FIGS. 20, 21).

It is noted that in the simultaneous mode of operation, the optical mask turret 100 is not rotated since the entire film is exposed at one time. To prepare the camera for additional exposure, the reset button 146*b* is depressed, thereby energizing A coil to reset the double holding relay 145 into the position shown in FIG. 16. When the optical mask turret 100 is in the position shown in FIG. 7, the sequential stop switch 134 is closed so that operation of the mode select switch 156 automatically causes the turret 100 to rotate until it is in position to take a first of the sequential mode exposures.

It will be readily observed from the foregoing detailed description of the invention and in the illustrated embodiments thereof that numerous variations and modifications may be effected without departing from the true spirit and scope of the novel concepts and principles of this invention.

We claim:

1. An exposure assembly for simultaneously or sequentially effecting a plurality of split image exposures, each within a different region in a fixed area comprising means defining a plurality of groups of lens openings, there being one group of lens openings for each of said regions, each group including a different lens opening for each image, optical masking means disposed between said lens openings and said area to be exposed, said masking means defining a first plurality of groups of apertures and a second plurality of apertures, means for positioning said masking means to sequentially align different groups of said first plurality of apertures with different groups of said lens openings and to alternatively align all of said second plurality of apertures with all of said lens openings, shutter means disposed between said lens openings and said area, timing means for selectively operating said shutter means to effect said multiple image exposure of each region through each group of apertures aligned with a corresponding group of lens openings, and for automatically activating said mask positioning means when the aligned group of apertures is from said first plurality to position said masking means to align another group of exposure apertures from said first plurality with another group of lens openings for subsequent split image exposure of another of said regions.

2. The assembly of claim 1 in which said masking means is a rotatable turret and in which said mask positioning means rotates said turret to align said apertures with said lens openings.

3. The assembly of claim 1 including means for automatically inactivating said timing means after all of said regions are exposed.

4. The assembly of claim 1 including circuit means having selecting switch means, said mask positioning means being responsive to one position of said selecting switch means for aligning a first of said groups of said first plurality of apertures in alignment with a first group of said lens openings, and responsive to another position of said selecting switch means for aligning said second plurality of said apertures in alignment with all of said lens openings.

5. The assembly of claim 4 wherein said circuit means includes first switch means operated in response to said timing means after each exposure is effected, said mask positioning means being activated in response to the operation of said first switch means when said selecting switch means is in said one position for aligning another group of exposure apertures from said first plurality with another group of lens openings.

6. In a camera for successively and simultaneously effecting a pair of split image exposures on a single photosensitive surface, the improvement comprising two pairs of lens openings, each pair for effecting a split image exposure of a different region of the photosensitive material, an optical mask disposed between said lens openings and said film, said mask defining a first pair of apertures, a second pair of apertures and a third double pair of apertures, means for rotating said mask to sequentially align said first pair of apertures with one pair of said lens openings and second pair of apertures with the second pair of lens openings and for alternatively aligning said double pair of apertures with both pairs of said lens openings, a shutter plate defining an exposure slot for each lens opening, an axial extension formed on said shutter plate, means for reciprocably rotating said shutter plate between an open position to expose regions of the film through lens openings aligned with optical mask apertures and a closed position wherein the film is optically separated from said lens openings, said shutter operating means comprising a rotatable disc having a pin engageable with said axial extension for initiating movement of said shutter from said closed to said open position and a bias spring connected to said shutter plate for moving said shutter plate from said open to said closed position, switch means responsive to said shutter operating means for initiating operation of said mask rotating means to rotate said mask from a first position wherein the said first pair of mask apertures are aligned with a first pair of lens openings to a second position wherein said second pair of mask apertures are aligned with a second pair of lens openings, second switch means for altering operation of said mask rotating means to align all of said third double pair of apertures with all of said lens openings whereby split image exposures of different regions of the film may be effected sequentially through said first and second pairs of apertures and alternatively simultaneously through said third double pair of apertures.

7. An exposure assembly for simultaneously or sequentially exposing each of a plurality of regions within a fixed area through a plurality of lens openings comprising lens support structure for defining a group of lens openings for each region to be exposed, optical masking means disposed between said lens openings and said area, said optical masking means defining first and second pluralities of apertures, each plurality of apertures corresponding to the number of lens openings, means for positioning said optical masking means to sequentially align different groups of said apertures from said first plurality with successive groups of said lens openings, and for alternatively aligning all of said apertures from said second plurality with all of said lens openings, shutter means disposed between said lens apertures and said area to be exposed, and means for operating said shutter to simultaneously expose those regions within said area through those apertures in said optical masking means aligned therewith and with lens openings.

8. The assembly as claimed in claim 7 in which said shutter means includes a rotatable plate axially aligned with said lens openings and means for reciprocably rotating said shutter plate between an open position wherein all said lens openings are aligned with slots in said shutter plate and a closed position wherein all said lens openings are optically covered by said shutter plate.

9. The assembly as claimed in claim 7 in which said optical masking means is a rotatable turret and further including means responsive to said shutter operating means when a first group of apertures from said first plurality are aligned with a first group of lens openings for initiating rotation of said turret to align a second group of apertures from said first plurality with a second group of lens openings, whereby split image exposures of different regions within said area are sequentially exposed through different groups of lens openings.